(12) United States Patent
Woody

(10) Patent No.: US 7,289,932 B2
(45) Date of Patent: Oct. 30, 2007

(54) ANGULAR POSITION, SPEED AND DIRECTION ENCODING OF A ROTATING MEMBER

(75) Inventor: Daniel Woody, Rochester Hills, MI (US)

(73) Assignee: Bosch Rexroth Corporation, Hoffman Estates, IL (US)

( * ) Notice: Subject to any disclaimer, the term of this patent is extended or adjusted under 35 U.S.C. 154(b) by 0 days.

(21) Appl. No.: 10/997,012

(22) Filed: Nov. 24, 2004

(65) Prior Publication Data

US 2006/0111867 A1    May 25, 2006

(51) Int. Cl.
G01B 11/02    (2006.01)
G01B 7/00    (2006.01)

(52) U.S. Cl. .................... 702/163; 702/145

(58) Field of Classification Search ............ 702/33, 702/104, 105, 115, 116, 145, 151, 163, 142, 702/148, 149, 150; 318/491, 647, 652, 653
See application file for complete search history.

(56) References Cited

U.S. PATENT DOCUMENTS

| | | | |
|---|---|---|---|
| 3,858,415 A * | 1/1975 | Wilson et al. ............. 66/210 |
| 5,068,529 A | 11/1991 | Ohno et al. | |
| 5,214,426 A * | 5/1993 | Minohara et al. ............. 341/13 |
| 5,570,016 A * | 10/1996 | Schroeder et al. ...... 324/207.25 |
| 6,118,271 A | 9/2000 | Ely et al. | |
| 6,172,500 B1 | 1/2001 | Bicking | |
| 6,232,739 B1 | 5/2001 | Krefta et al. | |
| 6,291,989 B1 | 9/2001 | Schroeder | |
| 6,346,808 B1 | 2/2002 | Schroeder | |
| 6,566,867 B1 * | 5/2003 | Schroeder et al. ...... 324/207.22 |

FOREIGN PATENT DOCUMENTS

FR    2 495 327    6/1982
GB    2 220 314    1/1990

OTHER PUBLICATIONS

International Search Report for PCT/IB2005/053851.
Delphion English Record provided for FR-2 495 327, 2 pages.

* cited by examiner

Primary Examiner—Bryan Bui
(74) Attorney, Agent, or Firm—Rader, Fishman & Grauer PLLC

(57) ABSTRACT

A spatial detection apparatus comprising a rotating member having a predetermined number of teeth angularly spaced about its circumference at predetermined distances to form a bit pattern; at least one sensor capable of detecting a rising edge and a falling edge of the teeth; and a processor configured to detect at least a portion of the bit pattern based on inputs from the sensor.

32 Claims, 5 Drawing Sheets

ANGULAR POSITION, SPEED AND DIRECTION ENCODING OF A ROTATING MEMBER

FIELD OF THE INVENTION

This application relates generally to the field of spatial detection and, more particularly, to determining the angular position, angular velocity, and direction of travel of a rotating member.

BACKGROUND OF THE INVENTION

Various apparatuses and methods have, over the years, been developed for determining the position and speed of rotating materials or objects. For example, in the field of mechanical engineering, and more particularly the field of crankshaft mechanics, a number of apparatuses and methods have been developed in an effort to accurately determine the position and speed of a crankshaft associated with an engine to improve, for example, the engine ignition timing, and also to prevent potential engine misfire, and to more efficiently control engine emissions. However, these conventional apparatuses and methods suffer from a number of drawbacks and deficiencies.

According to one approach, a number of equally-spaced and equally-sized teeth are formed on a target wheel that rotates in unison with, for example, a crankshaft. The relative incremental rotational position and speed of the target wheel and the crankshaft is determined by sensing the passing of rising or falling edges of the teeth by a sensing element disposed in proximity to the target wheel. Since each tooth formed on the target wheel is equally-spaced and equally-sized, however, the position of the crankshaft may only be accurately determined in an incremental manner by counting each passing tooth. As a result, the relative rotational position of the crankshaft must always be determined in connection with some form of starting position or reference value.

According to another approach, equally-spaced teeth are formed along the periphery of a target wheel that rotates in unison with a crankshaft. The rotational position of the target wheel is determined by monitoring the rising and falling edges of the passing teeth, which form a bit pattern, on the target wheel via a sensing element.

According to this conventional approach, a minimum number of sequential bits must be monitored by the sensing element before the relative rotational position of the target wheel may be accurately determined, resulting in computational delay. In addition, because a minimum of six (6) sequential bits must be monitored by the sensing element, this conventional approach is incapable of determining the static position of the target wheel; namely, the target wheel must always be in motion in order for its relative rotational position to be accurately determined.

Accordingly, there is a need to be able to determine the static and dynamic angular position of a rotating member without reliance on starting positions or reference values. Moreover, there additionally exists a need to be able to determine the angular position of a rotating member at any particular point in time without having to monitor a plurality of sequential bits. It would further be desirable, particularly with the afore-mentioned needs met, to be able to detect the angular velocity and the direction of travel of the rotating member.

BRIEF SUMMARY OF THE INVENTION

In at least one embodiment, a spatial detection apparatus comprises a rotating member having a predetermined number of teeth angularly spaced about its circumference at predetermined distances to form a bit pattern; at least one sensor capable of detecting a rising edge and a falling edge of the teeth; and a processor configured to detect at least a portion of the bit pattern based on inputs from the sensor.

In some embodiments, the processor determines, based on inputs from the sensor, the angular velocity of the rotating member. The processor may also determine, based on inputs from the sensor positioned in proximity to the rotating member, the angular position of the rotating member.

According to some embodiments, the spatial detection apparatus further comprises a trigger sensor for detecting the rising edge and the falling edge of the teeth; a first direction sensor for detecting the bit value of the teeth at a first predetermined position in response to the detection of the rising edge or the falling edge by the trigger sensor; and a second direction sensor for detecting the bit value of the teeth at a second predetermined position in response to the detection of the rising edge or the falling edge by the trigger sensor; wherein the processor determines, based on inputs from the first direction sensor and the second direction sensor, the direction of travel of the rotating member.

In at least one embodiment, the first direction sensor is positioned 7d/8 from the trigger sensor, where d is equal to the distance between adjacent edges of the teeth. The second direction sensor may also be positioned 9d/8 from the trigger sensor. Each of the trigger sensor, first direction sensor and second direction sensor may also be a Hall Effect sensor.

According to some embodiments, the spatial detection apparatus further comprises a predetermined number of position sensors; wherein the processor determines, based on inputs from these position sensors, the static angular position of the rotating member. Each of these predetermined number of position sensors may be a Hall Effect sensor.

In at least one embodiment, the number of the position sensors necessary to determine the static angular position of the rotating member is predetermined based on the following equation: Integer($Log_2(No_{Teeth})$)+Integer ($2^{Fraction(Log_2(NO_{Teeth}))}$), where $No_{Teeth}$ is equal to the number of teeth spaced about the circumference of the rotating member, Integer is a whole number component and Fraction is a fractional number component.

In some embodiments, the position sensors may be positioned a distance d from one another, where d is equal to the distance between adjacent edges of the teeth. A first position sensor of the predetermined number of position sensors may also be positioned a distance of (nd+d/2) from a trigger sensor, where n equals a predetermined number of teeth and d is equal to the distance between adjacent rising edges of the teeth.

According to at least one embodiment, the bit pattern is encoded based on a Manchester coding technique. The predetermined number of teeth may also be equal to eight.

In at least one embodiment, each of the predetermined number of teeth and the spaces formed therebetween correspond to an individual binary value, with the individual binary values collectively comprising the bit pattern. This bit pattern may comprise a repeating binary number sequence based on the individual binary values of the teeth and the spaces formed therebetween, with the repeating binary number sequence comprising a predetermined number of unique binary numbers, and each of the binary numbers corresponding to a unique angular position of the rotating member.

According to some embodiments, the processor determines the dynamic angular position of the rotating member based on at least a portion of the repeating binary number sequence input from the at least one sensor. The processor may also determine the dynamic angular position of the rotating member by referring to a shift state diagram.

In at least one embodiment. the word size of each of the binary numbers in the repeating binary number sequence is predetermined based on the following equation: Integer $(Log_2(No_{States}))$+Integer$(2^{Fraction(Log_2(No_{Teeth}))})$, where $No_{States}$ is equal to the least number of teeth required to determine the static angular position of the rotating member, $No_{Teeth}$ is equal to the number of teeth spaced about the circumference of the rotating member, Integer is equal to a whole number component and Fraction is equal to a fractional number component.

According to at least one embodiment, a method of detecting the spatial characteristics of a rotary object comprises the steps of encoding a rotating member with a predetermined number of teeth angularly spaced about its circumference at predetermined distances to form a bit pattern; detecting a rising edge or a falling edge of each of the teeth by at least one sensor; and determining the spatial characteristics of the rotary object by decoding at least a portion of the bit pattern via a processor based on inputs from the at least one sensor.

DETAILED DESCRIPTION

I. Overview

Figure 1:
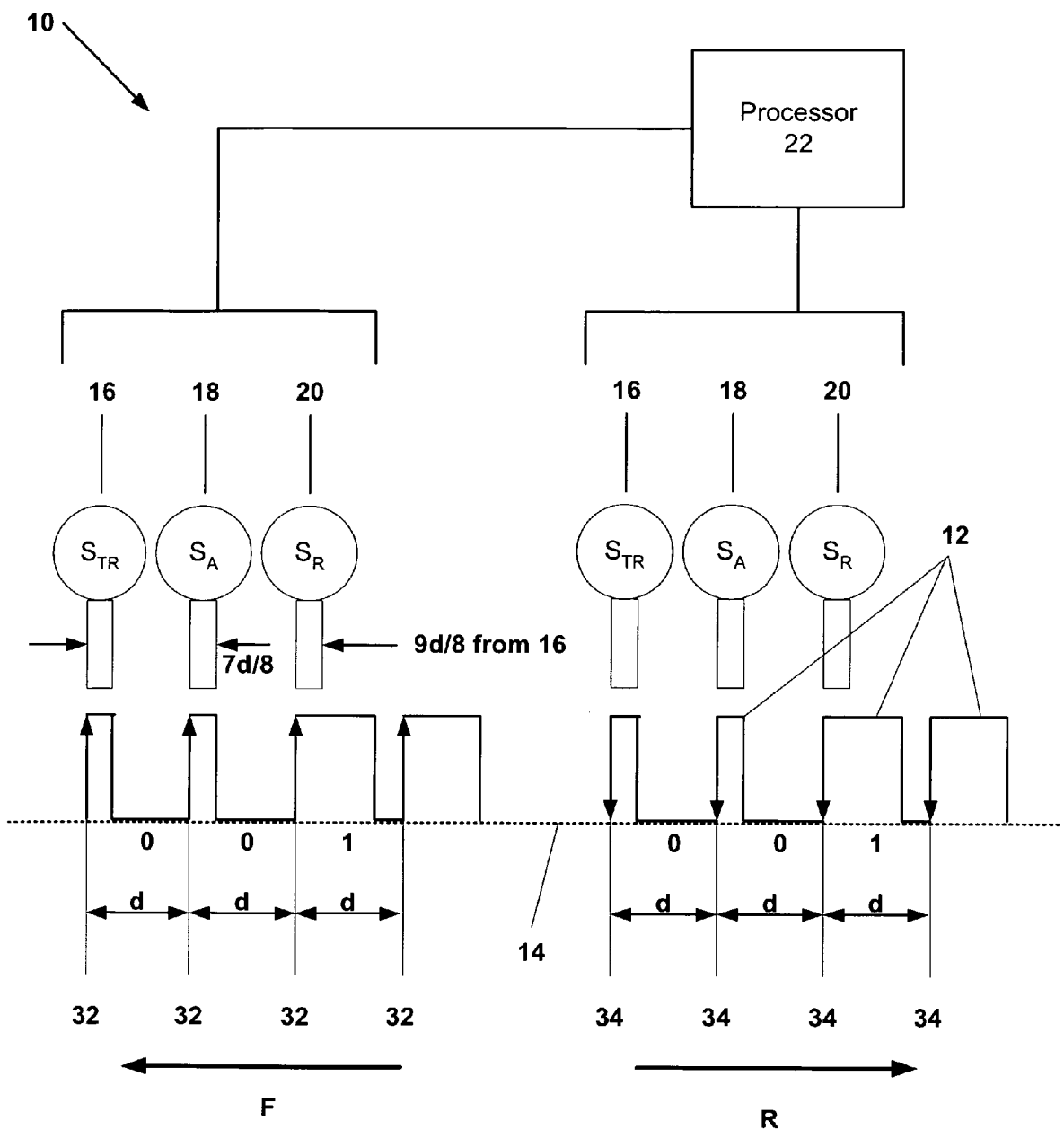
FIG. 1 illustrates an exemplary embodiment of a detection apparatus for determining the direction of travel and angular velocity of a rotating member.

FIG. 1 illustrates an exemplary embodiment of a spatial detection apparatus 10 for determining the angular position, direction of travel and angular velocity of a rotating member 14. According to at least one exemplary embodiment, detection apparatus 10 comprises a predetermined number of teeth 12 angularly spaced about the circumference of rotating member 14 to form a bit pattern. In the illustrated embodiment the coded teeth 12 extend completely about the entire circumference of rotating member 14.

At least one sensor, such as sensors 16, 18 and 20 shown in FIG. 1, is disposed in proximity to rotating member 14, the outputs of which are provided to processor 22. Rotating member 14 may be any member known in the art capable of rotation, including, for example, a crankshaft, a drive shaft, and a cam shaft or a target wheel rotating in unison with any one of the same.

Figure 2:
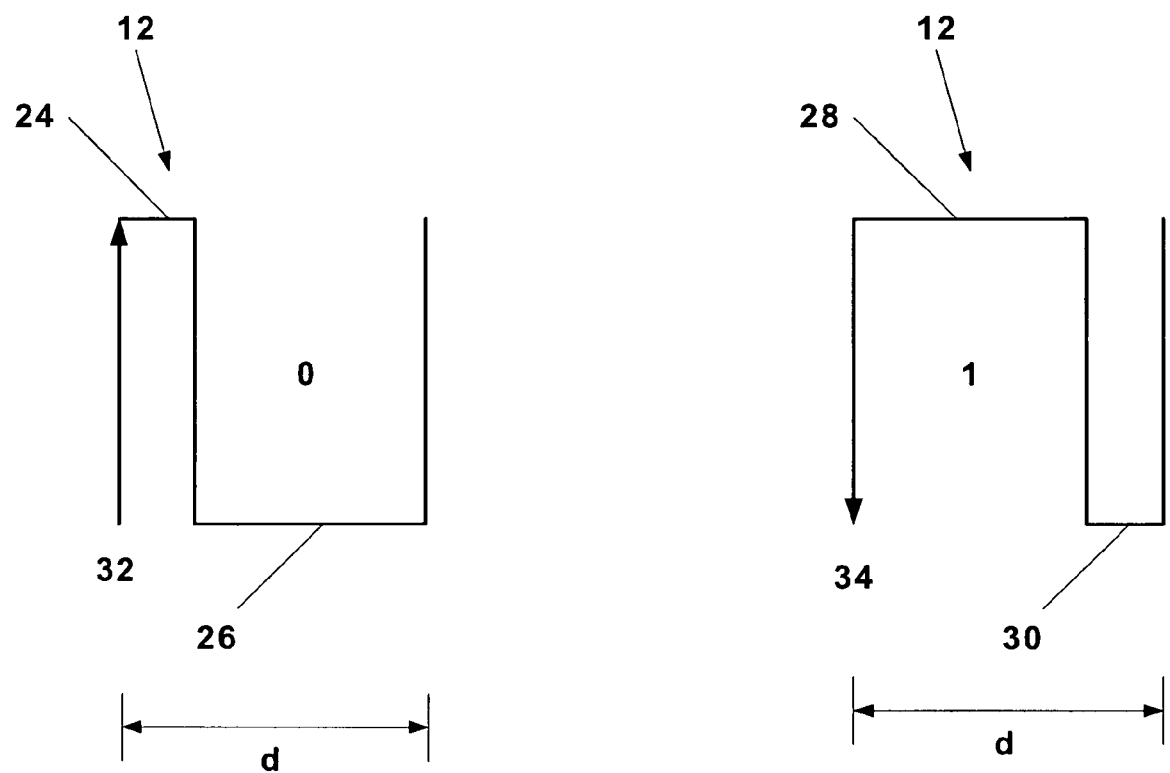
FIG. 2 illustrates an exemplary bit pattern encoding technique.

As illustrated in FIG. 1, teeth 12 are not uniform. Instead, in the illustrated embodiment, they are one of two shapes, each of the two shapes represented by either a "0" or a "1". FIG. 2 illustrates exemplary bit pattern encoding technique for use in connection with the embodiment of FIG. 1. In general, each tooth 12 formed along the circumferential surface of rotating member 14 corresponds to an individual binary value collectively comprising a repeating bit pattern. According to the exemplary encoding technique illustrated in FIG. 2, a binary zero "0" is defined in teeth 12 as a short land 24 followed by a long trough 26, while a binary one "1" is defined as a long land 28 followed by a short trough 30. The length or circumferential extent "d" of each tooth 12 is the same. Moreover, a short land 24 has the same circumferential extent as a short trough 30 while a long trough 26 has the same circumferential extent as a long land 28.

This exemplary return-to-zero encoding technique, generally referred to as Manchester encoding, allows the bit pattern encoded in teeth 12 along the surface of rotating member 14 to be determined irrespective of the direction of travel of rotating member 14. As discussed below, from the use of this approach, it is possible to derive the stationary or dynamic position of the rotating member 14 as well as its direction and speed.

The encoding approach illustrated allows bidirectional recognition of teeth 12. For example, when rotating member 14 travels together with teeth 12 in a forward direction F (from right to left), as illustrated in FIG. 1, a rising edge 32 of each tooth 12 indicates the beginning of a binary value. Thus, the rising edges are the evenly spaced or timed (when member 14 moves at a constant angular velocity) references "d". Conversely, when rotating member 14 travels together with teeth 12 in a reverse direction R (from left to right), a falling edge 34 of each tooth 12 indicates the beginning of a binary value. This means that the falling edges are the evenly spaced or timed references "d". Thus, in the illustrated embodiment, each rising edge 32 and each falling edge 34 is evenly spaced from one another by "d". The evenly spaced pulses are referred to as synch pulses. In the case of rising edge synch pulses, the positive pulse precedes the negative pulse (forward direction) and the rising edge indicates the start of a tooth event (either zero or one). In the case of falling edge synch pulses, the negative pulse proceeds the positive pulse (reverse direction) and the falling edge indicates the start of tooth event (again either zero or one).

Although the encoding of teeth 12 has been described in connection with the Manchester encoding technique, teeth 12 may also be encoded using any number of encoding techniques known in the art; including, for example, non-return-to-zero encoding techniques. The distance between adjacent rising edges 32 and adjacent falling edges 34 may also be varied such that teeth 12 are irregularly spaced along the circumferential surface of rotating member 14.

Returning to the exemplary embodiment illustrated FIG. 1, the rising edges 32 or falling edges 34 of teeth 12 are detected by at least one sensor disposed in proximity to the surface of rotating member 14. In at least one embodiment, the direction of travel of rotating member 14 is detected by a trigger sensor 16, a first direction sensor 18 and a second direction sensor 20 formed in proximity to the surface of rotating member 14. Collectively, sensors 16, 18, and 20 are defined as a "directional group".

In some embodiments, sensors 16, 18 and 20 are Hall Effect sensors capable of detecting the static position of teeth 12. As is known to those skilled in the art, a voltage is generated transversely to the current flow direction in an electric conductor (the Hall voltage) if a magnetic field is applied perpendicularly to the conductor. As the Hall Effect is most pronounced in semiconductors, often a Hall Effect sensor is a platelet made of semi conductive materials. A Hall Effect sensor is particularly useful when the rotating member 14 is metallic since many such sensors are able to detect metal proximity.

In other embodiments, sensors 16, 18 and 20 are variable reluctance sensors capable of detecting the rising and falling edges of teeth 12 when rotating member 14 is in motion. However, unlike a Hall Effect sensor, a variable reluctance sensor has no static referencing capability, and therefore Hall Effect sensors are preferred over variable reluctance sensors.

In the exemplary embodiment illustrated in FIG. 1, the output signals of first direction sensor 18 and second direction sensor 20 are latch-enabled with the detection of a rising edge 32 by trigger sensor 16. As shown in FIG. 1, upon detection of a rising edge 32 by trigger sensor 16, the binary values of each tooth 12 positioned directly below first direction sensor 18 and second direction sensor 20 are detected. Upon the detection of a rising edge 32 by trigger sensor 16, the output signals of first direction sensor 18 and second direction sensor 20 are provided to processor 22, which determines the direction of travel of rotating member 14.

In at least one embodiment, processor 22 determines the direction of travel of rotating member 14 based on the outputs of the latched position sensors 18 and 20 with respect to trigger sensor 16. According to this exemplary embodiment, a negative polarity output indicates a forward direction of travel F, while a positive polarity output indicates a reverse direction of travel R. In the illustrated embodiment, the outputs of sensors 18 and 20 are fed into an AND latch, such as will be known to those skilled in the art. If the output of these sensors is negative (or a binary "0"), then the rotating member 14 is determined by processor 22 to be traveling in a forward direction, e.g., (NOT $S_A$ AND $S_R$=0). To determine whether the rotating member 14 is traveling in a reverse direction, the outputs of sensors 18 and 20 are fed into an OR latch, such as will be known to those skilled in the art. If the output of this latch is positive (or a binary "1"), then the rotating member is determined to be traveling in a reverse direction e.g., ($S_A$ OR NOT $S_R$=1).

Thus, trigger sensor 16 will detect the rising edges for sensor 18, which is located a number of tooth positions from sensor 16 and for sensor 20, which is located a number of additional tooth positions from the trigger sensor (relative to the forward motion) and will have their signals latched by the rising edge 32 of the trigger sensor. According to at least one embodiment, in which there are eight teeth, first direction sensor 18 is positioned 7d/8 from trigger sensor 16, where d is equal to the distance between adjacent rising edges of teeth 12. Second direction sensor 20 may be positioned 9d/8 from trigger sensor 16. Spacing first direction sensor 18 and second direction sensor 20 from trigger sensor 16 in this manner allows the direction of travel of rotating member 14 to be determined solely from the inputs of first direction sensor 18 and second direction sensor 20. This exemplary embodiment is thus able to determine the direction of travel of rotating member 14 at any point in time, thereby eliminating the need to incrementally input a number of sequential binary values prior to determining the direction of travel.

In at least one embodiment, the angular velocity of rotating member 14 is determined by processor 22 based on inputs from at least one sensor, such as trigger sensor 16, disposed in proximity to rotating member 14. According to this exemplary embodiment, the angular velocity of rotating member 14 is determined by processor 22 based on the following equation:

$$V_{Angular} = \left(\frac{Angle}{No_{Teeth}}\right) \div \left(\frac{Time}{Tooth}\right) \qquad 1.1$$

where $V_{Angular}$ is the angular velocity of rotating member 14, Angle is the angle of rotating member 14, $No_{Teeth}$ is equal to the number of teeth 12 spaced about the circumference of rotating member 14 and (Time/Tooth) is equal to the amount of time that passes between the detection of adjacent rising edges 32 by the sensor. The angle of rotating member 14 may be determined as described below.

Whether the sensor, such as trigger sensor 16, used in determining the angular velocity of rotating member 14 is responsive to rising edges 32 or falling edges 34 of teeth 12 depends on the direction of travel of rotating member 14. For example, when rotating member 14 travels together with teeth 12 in a forward direction F, as illustrated in FIG. 1, trigger sensor 16 is responsive to a rising edge 32 of each tooth 12. Conversely, when rotating member 14 travels together with teeth 12 in a reverse direction R, trigger sensor 16 is responsive to a falling edge 34 of each tooth 12.

Thus, by detecting the time elapsed between each tooth 12 passing below trigger sensor 16, the angular velocity of rotating member 14 can be determined by processor 22 based on inputs from a single sensor, irrespective of the direction of travel of rotating member 14. In addition, as already noted above, by detecting the binary values of teeth 12 positioned directly below first direction sensor 18 and second sensor 20 in response to the detection of a rising edge 32 by trigger sensor 16, the direction of travel of rotating member 14 can be determined at any point in time.

II. Static Position Detection

Figure 3:
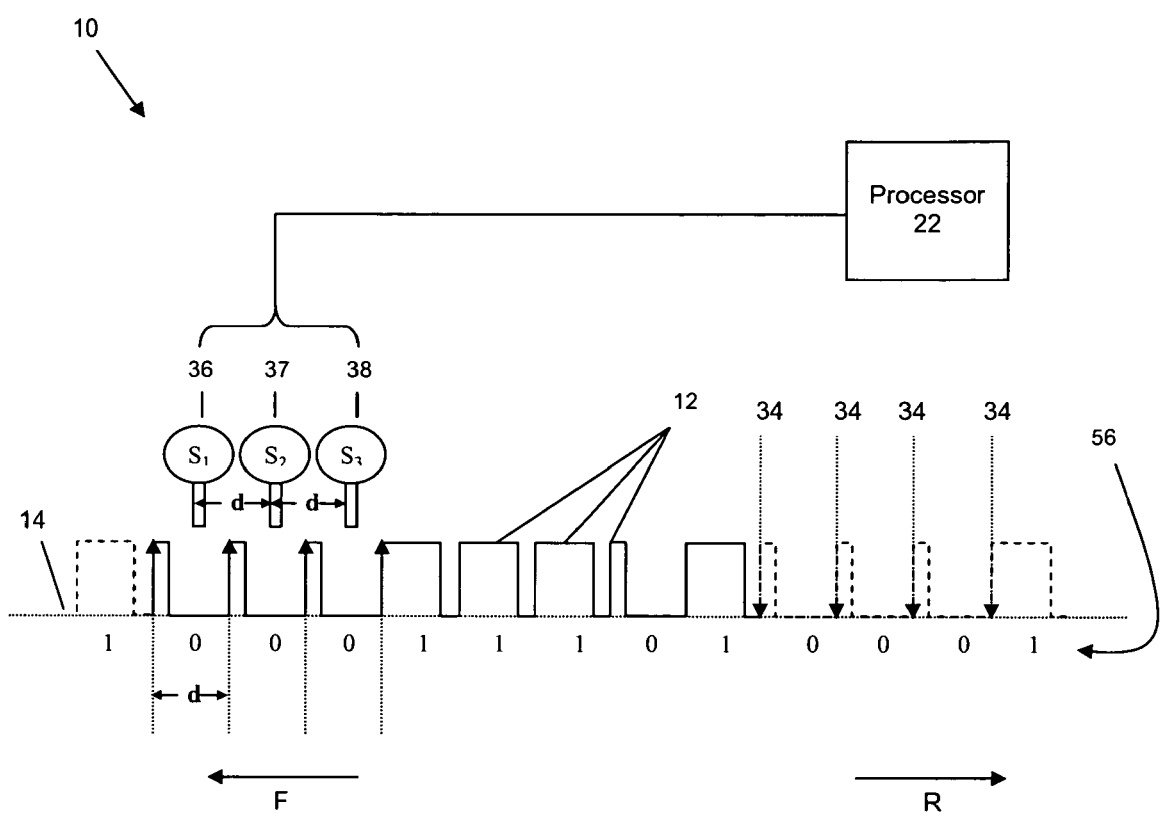
FIG. 3 illustrates an exemplary embodiment of a detection apparatus for determining the angular position and angular velocity of a rotating member.
Figure 4:
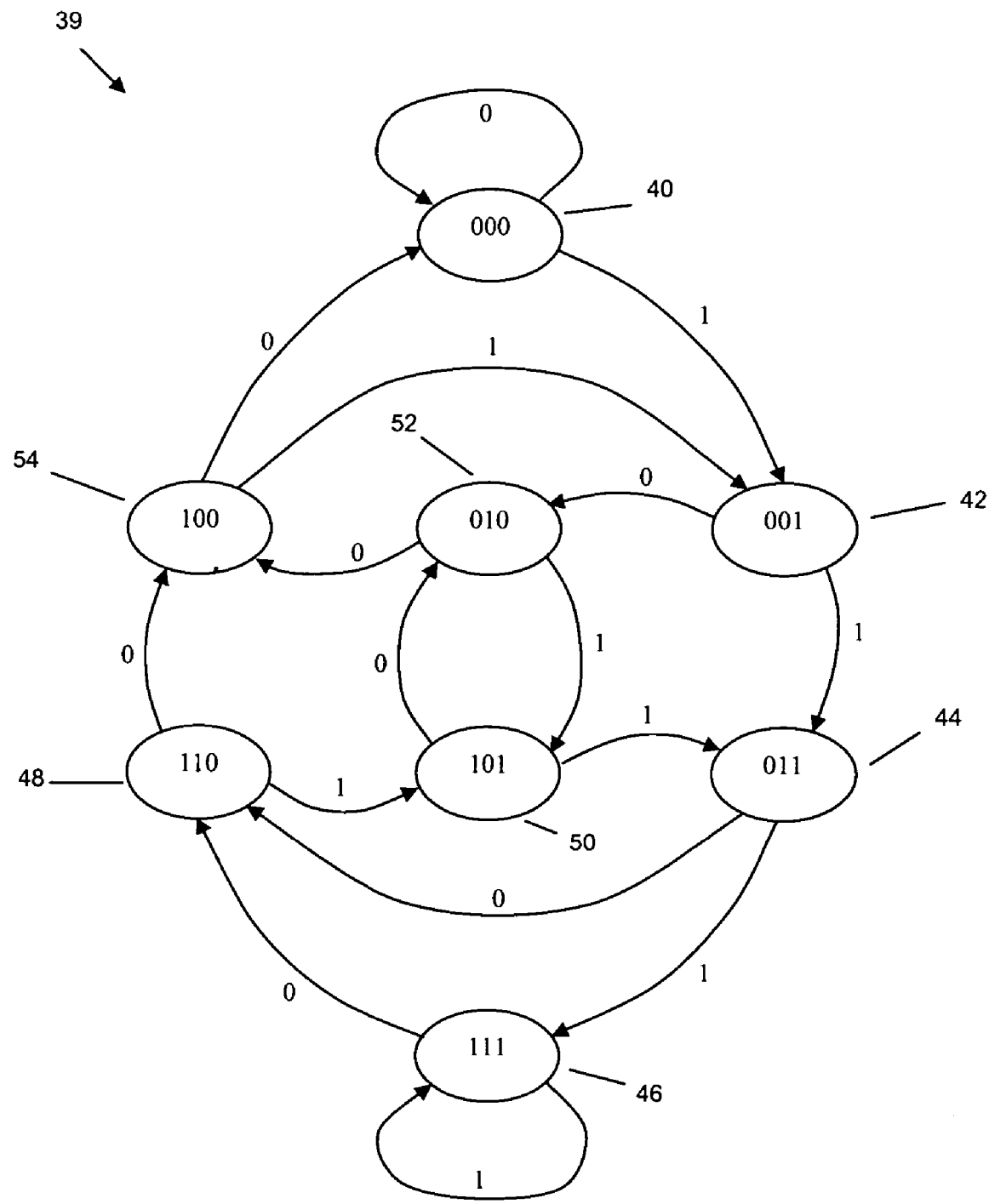
FIG. 4 illustrates an exemplary shift state diagram for use in determining the angular position of a rotating member.

FIG. 3 illustrates an exemplary embodiment of a detection apparatus for determining the angular position and angular velocity of a rotating member. FIG. 4 illustrates an exemplary shift state diagram for use in determining the angular position of a rotating member.

With reference to FIG. 3, according to at least one embodiment, the static angular position of rotating member 14 is determined automatically by processor 22 based on inputs from a plurality of position sensors, such as sensors 36, 37, and 38. The number of sensors required to determine the static angular position of rotating member 14 is directly related to the number of teeth 12 formed on the surface of rotating member 14, as expressed by the following equation:

$$No_{Sensors} = Integer(Log_2(No_{Teeth})) + Integer(2^{Fraction(Log_2(No_{Teeth}))}) \qquad 1.2$$

where $No_{Sensors}$ is the number of sensors required to determine the static angular position of rotating member 14, $No_{Teeth}$ is equal to the number of teeth 12 spaced about the circumference of rotating member 14, Integer specifies a function that obtains the nearest whole number of the expression in parentheses, and Fraction is a function that obtains a fraction.

With reference to FIG. 4, the number of states (binary number combinations) is equal to the number of teeth that must be detected to determine wheel position. An equation similar to equation 1.2 is used to determine the word size of the binary state:

$$\text{WordSize} = \text{Integer}(\text{Log}_2(\text{No}_{States})) + \text{Integer}(2^{\text{Fraction}(\text{Log}_2^{(\text{NoTeeth})})}) \quad 1.3$$

where $\text{No}_{States}$ is equal to the least number of teeth required to determine the static angular position of said rotating member, $\text{No}_{Teeth}$ is equal to the number of teeth spaced about the circumference of said rotating member, and Integer and Fraction are functions as described above.

In at least one exemplary embodiment, eight (8) teeth are formed on the surface of rotating member 14, such that, based on equation 1.2 set forth above, three (3) sensors are required to determine the static angular position of rotating member 14. More specifically, $\text{Integer}(\text{Log}_2(8 \text{ teeth})) + 0 = 3$ sensors. Similarly, the binary word size required to determine shaft position is 3 digits. The resolution of the encoder wheel is 360 degrees divided by eight teeth or 45 degrees/tooth.

As seen in the exemplary embodiment of FIG. 3, a first position sensor ($S_1$) 36, a second position sensor ($S_2$) 37, and a third position sensor ($S_3$) 38 are disposed proximately to the surface of rotating member 14, and are spaced apart from one another by a distance d corresponding to the distance between adjacent rising edges of teeth 12. In at least one embodiment, sensors 36, 37 and 38 are Hall Effect sensors capable of detecting the static position of teeth 12.

According to the exemplary embodiment illustrated in FIG. 3, the static position of rotating member 14 can be determined by detecting the binary values of each tooth 12 positioned directly below first position sensor 36, second position sensor 37, and third position sensor 38. Sensors 36, 37 and 38 are collectively called "positional sensors". In some embodiments, however, one or more of the directional sensors 16, 18 or 20 can also function as a positional sensor.

The binary values detected by the three position sensors in this embodiment together form a unique binary number corresponding to a unique position of rotating member 14. These binary values detected by the three position sensors in this embodiment, together forming the unique binary number, are then output to processor 22, which then determines automatically, based on a state diagram or other positional relationship heuristic known in the art, the static angular position of rotating member 14.

For example, the binary values detected by the three position sensors in the exemplary embodiment illustrated in FIG. 3 together form unique binary number "000", based on the binary values of each tooth 12 positioned directly below first position sensor 36, second position sensor 37, and third position sensor 38. The unique binary number "000" is then output to processor 22. According to at least one exemplary embodiment, processor 22 then determines the angular position of rotating member 14 based on exemplary state diagram 39 illustrated in FIG. 4.

As seen in FIG. 4, a predetermined number of unique binary numbers ("000", "001", "011", etc.) may correspond to a predetermined number of states 40, 42, 44, 46, 48, 50, 52 and 54 in state diagram 39. Each state 40, 42, 44, etc. corresponds to a unique position of rotating member 14, and accordingly, to a unique binary number. For example, according to the exemplary embodiment illustrated in FIG. 3, processor 22 determines, based on the input of the unique binary number "000" from the three position sensors that the angular position of rotating member 14 is at state 40.

Accordingly, by employing a plurality of position sensors capable of simultaneously detecting the binary values of a predetermined number of teeth 12, the angular position of rotating member 14 may be determined at any particular point in time without having to monitor a plurality of sequential bits input from a rotating member 14 in motion, as is required in conventional detection apparatuses. In other words, the angular position of rotating member 14 according to this exemplary embodiment may thus be determined even when rotating member 14 is at rest, thereby eliminating the need to rotate rotating member 14 in order to determine its position. Computational lag time is thus reduced advantageously, for example, in embodiments including an engine, resulting in decreased time to start the engine.

Figure 5:
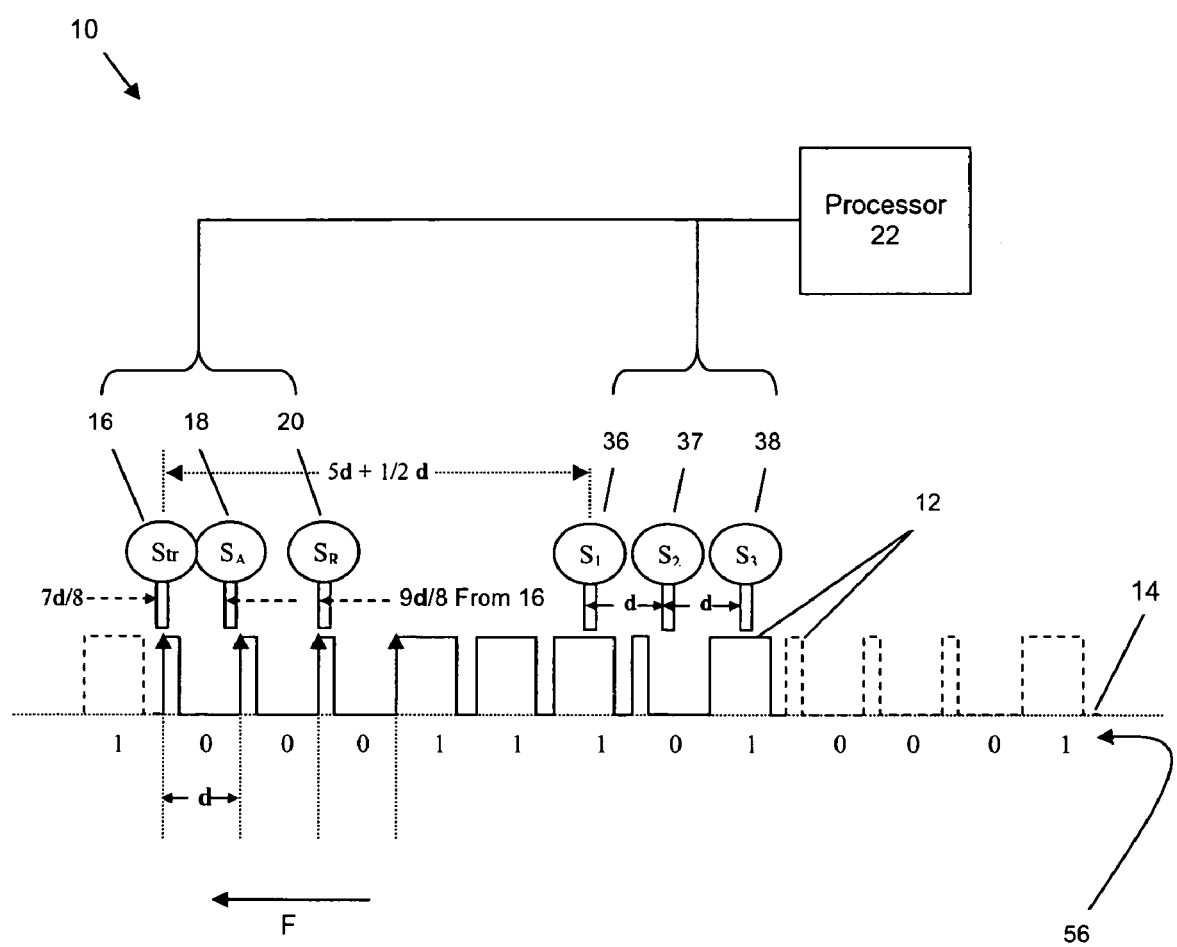
FIG. 5 illustrates an exemplary embodiment of a detection apparatus for determining the direction of travel, angular velocity and angular position of a rotating member.

As seen in the exemplary embodiment illustrated in FIG. 5, a plurality of position sensors 36, 37, 38 may also be used in conjunction with trigger sensor 16, first direction sensor 18 and second direction sensor 20. According to this exemplary embodiment, first position sensor 36 is spaced a distance of $(n*d) + \frac{1}{2}d$ from trigger sensor 16, where n is equal an arbitrary number of teeth and d is equal to the distance between any adjacent rising edges. Second position sensor 37 may then be spaced a distance of d from first position sensor 36, and third position sensor 38 may be spaced a distance of d from second position sensor 37.

By positioning each sensor in this manner, first position sensor 36, second position sensor 37 and third position sensor 38 are guaranteed to be positioned directly over either a land or a trough when trigger sensor 16 detects a rising edge 32. As such, first position sensor 36, second position sensor 37 and third position sensor 38 may be latched to trigger sensor 16 such that the binary values of teeth 12 may be detected by first position sensor 36, second position sensor 37 and third position sensor 38 upon the detection of a rising edge 32 by trigger sensor 16. Latching the position sensors to trigger sensor 16 in this manner allows for high speed synchronous operation and angular position detection.

Although eight (8) teeth and three (3) positional sensors are used in the exemplary embodiment illustrated in FIG. 3, the number of teeth and sensors required to determine the static position of rotating member 14 may be varied in accordance with equation 1.2. In addition, although the word size of the unique binary number detected in the exemplary embodiment illustrated in FIG. 3 is equal to three (3), because the word size of each unique binary is equal to the number of position sensors used to detect the position of rotating member 14 ("$\text{No}_{Sensors}$" in equation 1.2), the word size of each unique binary number may also vary in accordance with the number of position sensors used.

Moreover, because the precision with which the angular position of rotating member 14 can be determined (i.e, the resolution of detection apparatus 10) is directly proportional to the number of teeth 12 formed on the surface of rotating member 14, this precision may be varied by adding or removing teeth 12 from the surface of rotating member 14. In other words, the resolution of detection apparatus 10 may be increased by using a larger number of teeth 12 or decreased by using a lower number of teeth 12.

III. Dynamic Position Detection

According to at least one embodiment, the dynamic angular position of rotating member 14 may also be determined by processor 22 based on inputs from a single sensor by comparing the binary values input from this single sensor with shift state diagram 39, illustrated in FIG. 4. FIG. 5 illustrates an exemplary embodiment of a detection apparatus for determining the direction of travel, angular velocity and angular position of a rotating member.

As seen in FIG. 4, exemplary shift state diagram 39 comprises a number of states 40, 42, 44, 46, 48, 50, 52 and 54. The output of each state in shift state diagram 39 corresponds to a unique angular position of rotating member 14. According to this exemplary embodiment, a unique binary number sequence 56, shown in FIG. 5, is formed by following sequentially the output values of states 40, 42, 44, 46, 48, 50, 52 and 54. In this example, unique binary number sequence 56 equals binary "000", "001", "011", "111", "110", "101", "010" and "100" (or, in decimal, "0", "1", "3", "7", "6", "5", "2" and "4"), with each unique binary number in sequence 56 corresponding to a unique angular position of rotating member 14.

In at least one embodiment, processor 22 determines, based on at least a portion of this repeating binary number sequence 56 input from a single sensor, the dynamic angular position of rotating member 14. For example, once a single sensor, such as first position sensor 36 illustrated in FIG. 3, has detected and outputted a plurality of bit values equal to a word size (in this case, three (3)) from the moving teeth 12 passing directly below it, processor 22 can then accurately determine the angular position of rotating member 14. For example, should first position sensor 36 sequentially detect the binary values "0", "1" and "1", together forming the binary number "011", processor 22 then determines that the angular position of rotating member 14 is at state 44.

According to at least one embodiment, once a plurality of bit values equal to a word size have been input to processor 22 from first position sensor 36, shift state diagram 39 may also be used to determine the angular position of rotating member 14 upon the detection of each binary value from each tooth 12 passing below first position sensor 36. For example, once the binary values "0", "1" and "1", together forming the binary number "011", have been provided from first position sensor 36 to processor 22, processor 22 may then determine the dynamic angular position of rotating member 14 upon the detection of a single binary value by first position sensor 36 by shifting the originally detected binary number "011" by the newly inputted binary value. In other words, should first position sensor 36 detect a binary "1", processor 22 may shift the previously inputted binary number "011" by a single bit, resulting in the binary number "111", which corresponds to state 46 in shift state diagram 39.

Thus, by shifting previously inputted binary numbers by each new binary value detected by first position sensor 36, processor 22 is able to determine, based on a single inputted binary value, the dynamic angular position of rotating member 14 by referring to shift state diagram 39. The dynamic angular position of rotating member 14 can be thus be determined based on a single input from a single sensor, thereby resulting in decreased computational time and system complexity.

Although shift state diagram 39 is illustrated as comprising eight (8) states, any number or combination of states may be used. For example, if only five (5) states are desired, five instead of eight teeth 12 may be formed on the circumference of rotating member 14. States 46, 50, and 52 may be then be removed from shift state diagram 39, such that binary number sequence 56 progresses from state 40 to state 42 to state 44 to state 48 to state 54, and completing the path by returning to state 40. By varying the number of states, the resulting binary number sequence 56 is also varied. In an example where only five (5) states are desired, the resulting binary number sequence would be equal to "000", "001", "011", "110", and "100" (or, in decimal, "0", "1", "3", "6", and "5"). In general, it should be understood that more states will provide greater resolution in determining the speed and position of rotating member 14, whereas fewer states will allow for more efficient computations.

A variety of alternate paths may be chosen through shift state diagram 39 in accordance with the number of states desired or the binary number sequence 56 desired. For example, an alternate path through shift state diagram 39 may be chosen from state 40 to state 42 to state 52 to state 50 to state 44 to state 46 to state 48 to state 54, resulting in binary number sequence "000", "001", "010", "101", "011", "111", "110", "100" (or, in decimal, "0", "1", "2", "5", "3", "7", "6", "4").

In addition, according to at least one exemplary embodiment, the number of states used in shift state diagram 39 is always an even number, as expressed by the relationship $No^{States}=2^n \geq WordSize$, where $No_{States}$ is the number of states in shift state diagram 39, n is a predetermined number and WordSize is equal to the word size of each unique binary number. Shift state diagram may also be adapted to determine the dynamic angular position of rotating member 14 when traveling in either a forward F or a reverse R direction.

In general, in accordance with the teachings of the present disclosure, the direction of rotation detection apparatus 10 is determined first, followed by its angular velocity. Finally, the position of apparatus 10 can be located by processor 22.

VI. Alternative Embodiments

In accordance with the provisions of the patent statutes, the principles and modes of operation have been explained and illustrated. However, it should be understood that embodiments described herein may be practiced otherwise than is specifically explained and illustrated without departing from the spirit or scope thereof, and that the apparatus and method described herein are intended to be limited only by the following claims.

What is claimed is:

1. A spatial detection apparatus, comprising:
   a rotating member having a predetermined number of teeth angularly spaced about its circumference at predetermined distances to form a bit pattern, each tooth having a land and a trough, at least some of said teeth including at least one of said land and said trough having a different circumferential extent than at least one of said land and said trough included in others of said teeth;
   at least one sensor capable of detecting a rising edge and a falling edge of said teeth; and
   a processor configured to detect at least a portion of said bit pattern based on inputs from said at least one sensor.

2. The spatial detection apparatus according to claim 1, wherein said processor determines, based on said inputs from said at least one sensor, the angular velocity of said rotating member.

3. The spatial detection apparatus according to claim 1, wherein said processor determines, based on said inputs from said at least one sensor, the angular position of said rotating member.

4. The spatial detection apparatus according to claim 1, wherein said at least one sensor comprises:
   a trigger sensor for detecting the rising edge and the falling edge of said teeth;
   at least one direction sensor for detecting the bit value of said teeth at a predetermined position in response to the detection of said rising edge or said falling edge by said trigger sensor; and wherein said processor determines, based on inputs from said at least one direction sensor, the direction of travel of said rotating member.

5. The spatial detection apparatus according to claim 4, wherein a first direction sensor is positioned $$\frac{7d}{8}$$

from said trigger sensor, where d is equal to the distance between adjacent rising edges of said teeth.

6. The spatial detection apparatus according to claim 5, wherein a second direction sensor is positioned $$\frac{9d}{8}$$

from said trigger sensor.

7. The spatial detection apparatus according to claim 4, wherein at least one of said sensors is a Hall Effect sensor.

8. The spatial detection apparatus according to claim 1, wherein said at least one sensor comprises a predetermined number of position sensors; and
wherein said processor determines, based on inputs from said position sensors, the static angular position of said rotating member.

9. The spatial detection apparatus according to claim 8, wherein at least one of said predetermined number of position sensors is a Hall Effect sensor.

10. The spatial detection apparatus according to claim 8, wherein the number of said position sensors necessary to determine the static angular position of said rotating member is predetermined based on the following equation:

$$\text{Integer}(\text{Log}_2(\text{No}_{teeth})) + \text{Integer}(2^{Fraction(Log2(Noteeth))}),$$

where $\text{NO}^{Teeth}$ is equal to the number of teeth spaced about the circumference of said rotating member, Integer is a function yielding a whole number and Fraction is a function yielding a fractional number.

11. The spatial detection apparatus according to claim 8, wherein said position sensors are positioned a distance d from one another, where d is equal to the distance between adjacent rising edges of said teeth.

12. The spatial detection apparatus according to claim 8, wherein a first position sensor of said predetermined number of position sensors is positioned a distance of $$\left(nd + \frac{d}{2}\right)$$

from a trigger sensor, where n equals a predetermined number of teeth and d is equal to the distance between adjacent rising edges of said teeth.

13. The spatial detection apparatus according to claim 1, wherein said bit pattern is encoded based on a Manchester coding technique.

14. The spatial detection apparatus according to claim 1, wherein said predetermined number of teeth is equal to eight.

15. The spatial detection apparatus according to claim 1, wherein each of said predetermined number of teeth correspond to an individual binary value; said individual binary values collectively comprising said bit pattern.

16. The spatial detection apparatus according to claim 1, wherein said at least one sensor is positioned adjacent to said rotating member.

17. The spatial detection apparatus according to claim 1, wherein said bit pattern comprises a repeating binary number sequence based on the individual binary values of said teeth, said repeating binary number sequence comprising a predetermined number of unique binary numbers, each of said binary numbers corresponding to a unique angular position of said rotating member.

18. The spatial detection apparatus according to claim 17, wherein said processor determines the dynamic angular position of said rotating member based on at least a portion of said repeating binary number sequence input from said at least one sensor.

19. The spatial detection apparatus according to claim 18, wherein said processor determines the dynamic angular position of said rotating member by referring to a shift state diagram.

20. The spatial detection apparatus according to claim 17, wherein the word size of each of said binary numbers in said repeating binary number sequence is predetermined based on the following equation:

$$\text{Integer}(\text{Log}_2(\text{No}_{States})) + \text{Integer}(2^{Fraction(Log2(NoTeeth))}),$$

where $\text{No}_{States}$ is equal to the least number of teeth required to determine the static angular position of said rotating member, $\text{No}_{Teeth}$ is equal to the number of teeth spaced about the circumference of said rotating member, Integer is a function yielding a whole number and Fraction is a function yielding a fractional number.

21. A method of detecting at least one spatial characteristic of a rotating member encoded with a predetermined number of teeth angularly spaced about its circumference at predetermined distances and forming a bit pattern, said method comprising the steps of:
detecting a rising edge or a falling edge of each of said teeth by at least one sensor, wherein each tooth includes a land and a trough and at least some of said teeth include at least one of said land and said trough having a different circumferential extent than at least one of said land and said trough included in others of said teeth;
decoding at least a portion of said bit pattern via a processor based on inputs from said at least one sensor; and
determining, via said processor, based on said inputs from said at least one sensor; at least one of: the angular velocity of said rotating member, the angular position of said rotating member, a direction of travel of said rotating member; and a static angular position of said rotating member.

22. The method according to claim 21, wherein said at least one sensor comprises:
a trigger sensor for detecting the rising edge and the falling edge of said teeth; and
at least one direction sensor for detecting the bit value of said teeth at a first predetermined position in response to the detection of said rising edge or said falling edge by said trigger sensor;
wherein said inputs from at least one sensor include inputs from said at least one direction sensor.

23. The method according to claim 21,
said at least one sensor comprising a predetermined number of position sensors;
wherein said inputs from at least one sensor include inputs from said position sensors.

24. The method according to claim 23, comprising the step of positioning said teeth such that said rising edges of all of said teeth are positioned a common distance from an adjacent tooth.

25. The method according to claim 21, including the steps of forming each of said predetermined number of teeth and forming the spaces formed therebetween to correspond to an individual binary value; said individual binary values collectively comprising said bit pattern.

26. The method according to claim 21, wherein said bit pattern comprises a repeating binary number sequence based on the individual binary values of said teeth and the spaces formed therebetween, said repeating binary number sequence comprising a predetermined number of unique binary numbers, each of said binary numbers corresponding to a unique angular position of said rotating member.

27. The method according to claim 26, said processor determining the dynamic angular position of said rotating member based on at least a portion of said repeating binary number sequence input from said at least one sensor.

28. An apparatus having a circumference comprising a predetermined number of teeth angularly spaced about said circumference at predetermined distances to form a bit pattern, each tooth including a land and a trough, at least some of said teeth including at least one of said land and said trough having a different circumferential extent than at least one of said land and said trough included in others of said teeth.

29. The apparatus according to claim 28, wherein said teeth are positioned such that said rising edges of all of said teeth are positioned a common distance from an adjacent tooth.

30. The apparatus according to claim 28, said bit pattern is encoded using a Manchester coding technique.

31. The apparatus according to claim 28, wherein each of said predetermined number of teeth the lands and troughs included therein correspond to an individual binary value; said individual binary values collectively comprising said bit pattern.

32. The apparatus according to claim 28, wherein said bit pattern comprises a repeating binary number sequence based on the individual binary values of said teeth and, said repeating binary number sequence comprising a predetermined number of unique binary numbers, each of said binary numbers corresponding to a unique angular position of said rotating member.

* * * * *